United States Patent [19]

Holladay, Jr. et al.

[11] 4,057,801
[45] Nov. 8, 1977

[54] CONTINUOUS-WAVE RANGING SYSTEM

[75] Inventors: James Eugene Holladay, Jr., Salt Lake City; Billie Mike Spencer, Bountiful, both of Utah

[73] Assignee: Sperry Rand Corporation, New York, N.Y.

[21] Appl. No.: 672,808

[22] Filed: Apr. 1, 1976

[51] Int. Cl.² .............................................. G01S 9/37
[52] U.S. Cl. ................................................. 343/12 R
[58] Field of Search ..................................... 343/12 R

[56] References Cited
U.S. PATENT DOCUMENTS

| 2,709,253 | 5/1955 | Haywood et al. | 343/12 R |
| 3,199,104 | 8/1965 | Miller | 343/12 R |
| 3,307,192 | 2/1967 | Attwood | 343/12 R X |
| 3,618,099 | 11/1971 | Johnson | 343/12 MD X |
| 3,939,475 | 2/1976 | Lewis | 343/12 R |
| 3,968,491 | 7/1976 | Silberberg | 343/12 R |

Primary Examiner—Malcolm F. Hubler
Attorney, Agent, or Firm—John R. Flanagan; Marshall M. Truex

[57] ABSTRACT

A ranging system utilizing continuous-wave radio frequencies having unique relationships which occur at a predictable rate. A radio transmission system used for transmitting data has a portion of its baseband used to determine range to a target. Three frequencies within the portion of the baseband are so chosen that there is a periodic phase conicidence of the three frequencies which occurs at predetermined intervals. The phase coincidence is detected on transmission to and from a target to provide range information.

10 Claims, 4 Drawing Figures

CONTINUOUS-WAVE RANGING SYSTEM

BACKGROUND OF THE INVENTION

Typical ranging systems in present use employ radar techniques wherein a unique pulse is transmitted toward and reflected from a target or the like whose range is to be determined. The time interval between transmission of the pulse and its reflected return to the transmitter station is indicative of the distance between the transmitter station and the reflecting target.

Radar, of course, has grown into a highly-developed technology and is an extemely accurate and reliable means for determining distance between two objects. It requires highly sophisticated and costly equipment whose sole use is for ranging.

Quite often radio communication data links exist between many objects such as aircraft to aircraft, aircraft to ground, station-ground vehicles to ground vehicles. These data links which utilize continuous waves (as opposed to pulses) are used to transmit data back and forth between the objects.

These data links utilize continuous-wave radio signals which operate within a selected baseband to transmit data between objects.

The present invention contemplates use of a relatively small portion of the data-link frequency spectrum or baseband to determine range information. Thus, the present invention provides a ranging capability by utilizing data links and associated communication equipment which already exist between the objects. Since the ranging system of the present invention utilizes only a small portion of the baseband or frequency spectrum of the data link, actual ranging may take place simultaneously with transmission and reception of data on the same channel. More specifically, the present invention contemplates a ranging system wherein three tones or frequencies within a baseband of a continuous-wave communication system are selected which coincide in phase repetitively at constant time intervals which are greater than the time required to transmit and receive a signal from an object. The present invention generates the three tones from a reference oscillator source. A phase-coincidence detector at the transmitter master station detects phase coincidence of the three tones which provides a start pulse to a counter; and when the three tones are re-transmitted back from a remote station, a phase-coincidence detector at the receiver master station provides a stop pulse to the counter. The count in the counter which is a measure of time for the phase-coincident condition or time marker to be transmitted and received is converted to range.

OBJECTS

It is an object of the present invention to provide a radio-ranging system utilizing three tones within a data-link baseband spectrum.

It is another object of the present invention to provide a radio-ranging system utilizing three tones closely spaced in frequency to conserve data-link baseband spectrum.

Another object of the present invention is to provide a radio-ranging system which, but utilization of a small portion of the data-link frequency spectrum reserves most of the data-link frequency spectrum for transmission of data.

A further object of the present invention is to provide a radio-ranging system utilizing three tones closely spaced in frequency which permits use of the major portion of the data-link frequency spectrum for simultaneous transmission of data without interference with the range information or cross-tone interference.

DESCRIPTION OF THE INVENTION

Figure 2:
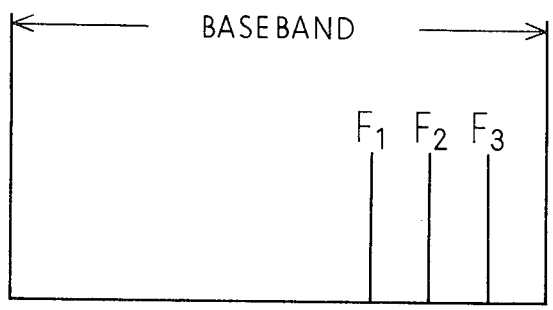
FIG. 2 is a graphic representation showing the relationship of the three tones relative to each other and within the data-link frequency spectrum.
Figure 3:
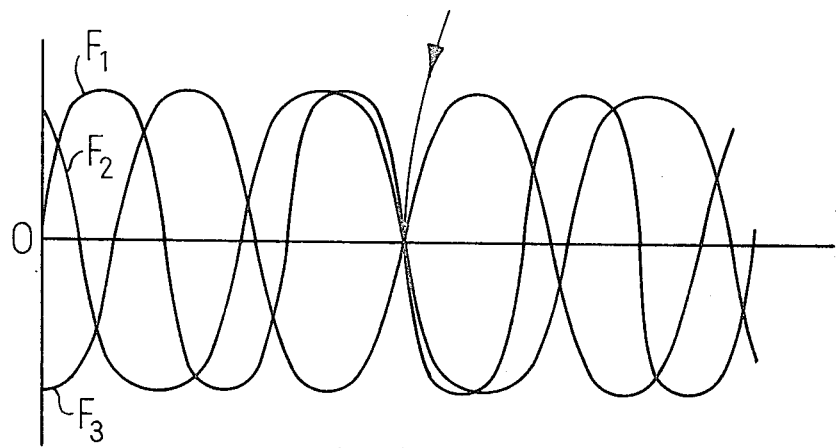
FIG. 3 is a graphic representation of the three frequency tones and their phase relationship.

Three frequencies or tones are chosen within a data-link frequency spectrum or baseband that become phase coincident at regular intervals. These frequencies as shown in FIG. 2 are $f_1$, $f_2$ and $f_3$ and are closely spaced and occupy a small portion of the frequency spectrum or baseband. The spacing position within the baseband and frequencies of $f_1$, $f_2$ and $f_3$ are all derived through mathematical analysis which also selects the frequencies so that they coincide in phase at regular intervals, which intervals are greater than the time it takes a signal to travel to and from a predetermined maximum range. This analysis also provides an adequate relative spacing to minimize the filtering requirements of $f_1$, $f_2$ and $f_3$.

While the mathematical analysis does not form a part of the present invention, the mathematical method for selecting optimum frequency or tone relationships is given below for purposes of background in understanding the present invention.

A ranging system that measures the two-way radio frequency between two stations to determine range requires that the ranging signals carry sufficient information to avoid ambiguous range measurements. In addition the range signal should be so structured as to permit resolution to a desired accuracy.

To obtain desired accuracy, phase measurement of the ranging signal is employed; and this required that the ranging signal has a frequency sufficiently high so that phase jitter caused by noise falls within the accuracy requirement of the system.

The present invention utilizes a unique phase relationship among the frequencies $f_1$, $f_2$ and $f_3$. Time between transmission and reception is measured utilizing this unique relationship, i.e., when all the frequencies and tones are phase coincident, which condition functions as a marker.

By mathematical analysis, an optimum set of three tones is selected so that their phase coincidence is repetitive and has a period at least equal to the desired two-way propagation time and that this phase-coincident condition is unique enough such that it can be reliably detected and all other phase conditions rejected. In addition the phase condition can be achieved to a desired range accuracy.

The mathematics for selecting optimum tone relationship to provide the three tones complying with the above conditions follows:

a. Choose an approximate value of $f_1$ incorporating the desired range resolution, i.e., $$f_1 = 2c \frac{\sqrt{\frac{N}{2S}}}{2\pi(\Delta R) \text{ (RMS)}}$$

where
$c$ = velocity of light
$N/2S$ = noise to signal ratio of the returned tones
$\Delta R$ = desired range accuracy
b. Choose an approximate value of $f_0$ for the desired course unambiguous range, i.e., $$f_0 \leq \frac{c}{2 \text{ RANGE (Max.)}}$$

where RANGE (Max.) is the greatest range over which ranging is to take place
c. Estimate $f_3 - f_1 = \sqrt{2} (f_1 f_0)$
d. Find value for $n_3 - n_1$ from nearest whole numbers of $(f_3 - f_1)/f_0$
e. Establish the value of $n_2 - n_1$ and $n_3 - n_2$ from $$n_3 - n_1 = 2(n_2 - n_1) + 1$$

$$n_3 - n_2 = (n_3 - n_1) - (n_2 - n_1)$$

where
$n_1$, $n_2$ and $n_3$ are whole numbers and
$n_1 f_0 = f_1$
$n_2 f_0 = f_2$
$n_3 f_0 = f_3$
f. Find $n_1$ from the equation $n_1 = (n_2 - n_1)(n_3 - n_1)$ from which $n_2$ and $n_3$ can be determined.
g. Establish value of $f_c$ from $$f_c = f_0 (n_3 - n_1)(n_2 - n_1) \text{ LCM } [(n_3 - n_1) + 1] [(n_1 - n_1) + 1]$$

where
$f_c$ is the reference frequency source from which $f_1$, $f_2$ and $f_3$ are derived.
LCM = least common multiple
From the foregoing $f_1$, $f_2$ and $f_3$ frequencies are known.
Time is marked by coincidence of the three frequencies, except at this time the analysis quarantees that the three tones will be separated by at least a minimum phase at all other times. This minimum phase is:

$$\phi_{min.} = 2\pi \frac{(n_2 - n_1)}{n_1} \text{ radians.}$$

Figure 1:
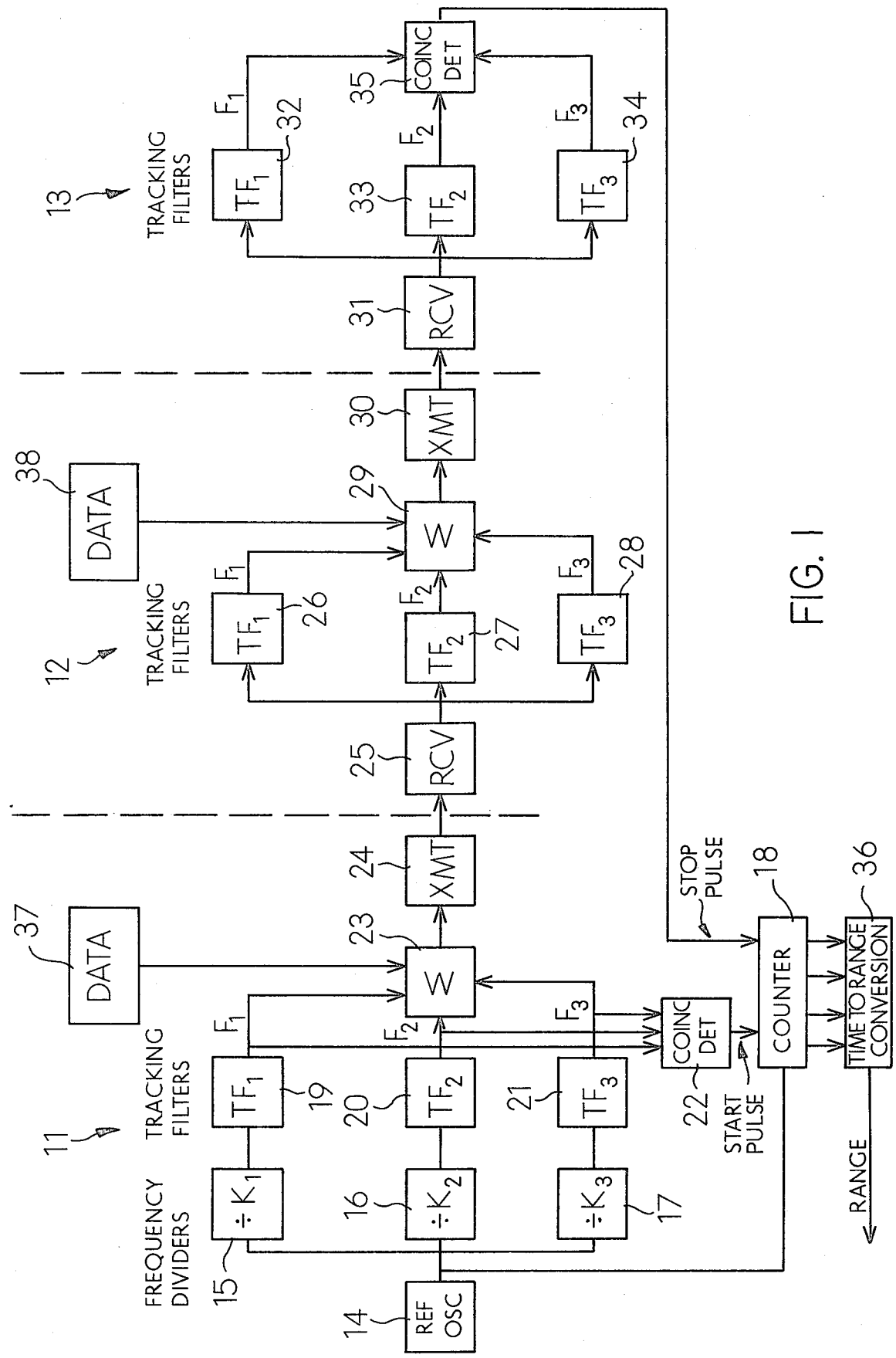
FIG. 1 illustrates in block-diagram form a preferred embodiment of the present invention.

Referring now to FIG. 1, there is shown the range finder system of the present invention. The range finder system comprises a master station transmitter 11, a remote station transmitter/receiver 12, and a master station receiver 13. The remote station receiver/transmitter is located on the object or objects, the range to which is to be determined.

The master station receiver comprises a reference oscillator 14 which provides an output signal having the reference frequency $f_c$. The output from the reference oscillator 14 is connected to three frequency dividers 15, 16 and 17 which divide the reference frequency $f_c$ into the frequencies $f_1$, $f_2$ and $f_3$, respectively.

The output of the reference oscillator 14 also is connected to a counter 18 and provides the source of clock pulses at whose rate the counter 18 counts when it receives a start pulse as will be explained more fully hereinbelow.

The output terminals of the frequency dividers 15, 16 and 17 are connected to phase-lock tracking filters 19, 20 and 21, respectively.

The tracking filters 19, 20 and 21 are narrowband filters which filter out unwanted harmonics in the frequencies $f_1$, $f_2$ and $f_3$.

Inasmuch as the dividers 15, 16 and 17 may in one embodiment produce square wave outputs, the phase-lock tracking filters also function to convert the square wave outputs into sinusoidal frequencies. Further, the tracking filters 19, 20 and 21 prevent phase drift of the frequencies $f_1$, $f_2$ and $f_3$.

The outputs of the phase-lock tracking filters 19, 20 and 21 are connected to a phase-coincidence detector 22 and to a summing device 23 where the frequencies $f_1$, $f_2$ and $f_3$ are summed prior to transmission. The data indicated by block 37 to be transmitted is also fed into the summing device where it is summed along with frequencies $f_1$, $f_2$ and $f_3$ and is transmitted along with the frequencies $f_1$, $f_2$ and $f_3$ within the same frequency spectrum or baseband.

The summing device 23 is connected to a transmitter 24 for transmission as a continuous wave.

The remote station 12 which may be carried by any object whose range is to be measured comprises a receiver 25 which receives the signal from the transmitter 24.

The output from the receiver 25 is fed to phase-lock tracking filters 26, 27 and 28 which function to separate the signal into the frequencies $f_1$, $f_2$ and $f_3$ as well as filter out the transmitted data and maintain the phase relationship between the frequencies $f_1$, $f_2$ and $f_3$.

The output $f_1$ and $f_2$ and $f_3$ from the phase-lock tracking filters 26, 27 and 28 are fed to summing device 29 prior to transmission back to the master station receiver 13. The summing device 29 has its output connected to a transmitter 30.

The master station receiver 13 comprises a receiver 31 for receiving the signal from the transmitter 30 of the remote station, the range to which is being measured. The output of the receiver 31 is connected to the phase-lock tracking filters 32, 33 and 34 which separate the signals again into the frequencies $f_1$, $f_2$ and $f_3$ and separate them from the data that is being transmitted simultaneously therewith. The phase-lock tracking filters also keep the phases of $f_1$, $f_2$ and $f_3$ stable, i.e., prevent phase change due to environmental changes such as temperature. Further, these filters minimize the phase change due to noise. It is important to maintain the phase relationships of $f_1$, $f_2$ and $f_3$ so that the phase-coincident points which are used to start and stop the counter 18 are not distorted.

The outputs of the phase-lock tracking filters 32, 33 and 34 are connected to phase-coincidence detector 35 which provides an output signal when frequencies $f_1$, $f_2$ and $f_3$ are in phase coincidence. The system has been designed to tolerate a minimum error. In other words, on return of the frequencies $f_1$, $f_2$ and $f_3$, their phase-coincident condition which is used as a time marker to stop the counter 18 may have deviated somewhat, i.e., frequencies $f_1$, $f_2$ and $f_3$ may cross the zero axis at slightly different times. However, the system will count such as a phase-coincident condition if they fall within an established window that is less than $$\phi_{min.} = 2\pi \frac{(n_2 - n_1)}{n_1}.$$

Figure 4:
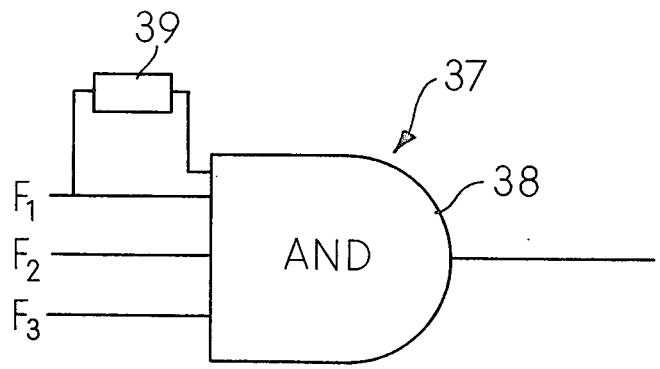
FIG. 4 is a representation of the structure establishing the window within the coincidence circuit at the master station receiver.

FIG. 4 shows coincident circuit 35 in somewhat more detail. The coincident circuit 35 comprises an AND gate 38. The AND gate receives three inputs which are frequencies $f_1$, $f_2$ and $f_3$. A single-shot circuit 39 receives frequency $f_1$ as an input and its output provides a fourth input to AND gate. This single-shot circuit is set in response to the $f_1$ input to provide a gate or window pulse to the AND circuit 38. The pulse width of the output from the single-shot circuit has a width or window determined by the $\phi$ min. equation. Thus, if the frequencies pass through zero within the time interval of the output pulse of the single-shot circuit, phase coincidence is deemed to have occurred; and the phase-coincidence detector 35 provides an output which is a stop pulse to counter 18.

The coincidence detector 22 may be identical to coincidence detector 35. However, since the frequencies $f_1$, $f_2$ and $f_3$ provided at the master station transmitter 11 are essentially noise free, a smaller time window can be used for coincidence at detector 22.

The phase-lock tracking filters 19, 20, 21, 26, 27, 28, 32, 33 and 34 are all identical and are conventional items. (See *Principles of Coherent Communication* by Andrew J. Viterbi published by McGraw-Hill, Inc., 1966, Library of Congress Catalog Card Number 66-22299.)

In the master station transmitter, the phase-lock tracking filters 19, 20 and 21 function to provide a narrow-band pass for the frequencies $f_1$, $f_2$ and $f_3$ to eliminate undesired harmonics and to maintain phase relationship of the frequencies $f_1$, $f_2$ and $f_3$ before application to summing device where they are mixed with data to be transmitted on the same baseband.

The remote-station, phase-lock tracking filters 26, 27 and 28 pass the frequencies $f_1$, $f_2$ and $f_3$ while maintaining the same phase relationship. In addition the transmitted data is filtered out. The frequencies $f_1$, $f_2$ and $f_3$ are summed in summing device 29 along with new data to be re-transmitted back to the master station.

The phase-lock tracking filters 32, 33 and 34 at the master station receiver 13 again separate the frequencies $f_1$, $f_2$ and $f_3$ while maintaining the same phase relationship. The returned data is also filtered out, and the effects of the radio-link induced noise are minimized.

The ranging system of the present invention is thus compatible with a data communication system wherein the baseband on which data is transmitted and returned shares a small portion of its frequency spectrum with the frequencies $f_1$, $f_2$ and $f_3$ which provide the range markers.

In operation the reference oscillator 14 provides the source of the three coherent frequencies $f_1$, $f_2$ and $f_3$. The reference frequency is divided into the frequencies $f_1$, $f_2$ and $f_3$ by means of the frequency dividers 15, 16 and 17, respectively, according to the mathematical analysis, such that the frequencies $f_1$, $f_2$ and $f_3$ are phase coincident at periodic intervals, which intervals are greater than the time it takes for a singal to travel to and return from a station of predetermined maximum range. These occurrences of phase coincidence are the time marks which are detected at the master station transmitter 11 and then on their return to the master station receiver 13 to establish the time interval indicative of range.

When phase coincidence or the time marker occurs at the master station transmitter 11, it is detected by phase-coincidence detector 22 to provide a start pulse to the counter 18 which counts at the rate of the reference frequency provided by reference oscillator 14.

The frequencies $f_1$, $f_2$ and $f_3$ are summed along with data to be transmitted and re-transmitted to the remote station whose range is to be determined.

The remote station 12 separates the frequencies and filters out the data and then sums the frequencies $f_1$, $f_2$ and $f_3$ with new data in summing device 29 and transmits it back to the receiver 31 of the master station receiver 13. The frequencies $f_1$, $f_2$ and $f_3$ are once again separated by the phase-lock tracking filters which also filter out the new data. The phase-coincident condition of frequencies $f_1$, $f_2$ and $f_3$ which has remained substantially intact with the aid of the various phase-lock tracking filters is detected by the phase-coincidence detector 35 which provides a stop pulse to counter 18. The count in counter 18 which is indicative of range is converted to actual range in converter 36 whence it may be displayed in any convenient manner.

Despite the care used to maintain the phase relationship of the frequencies $f_1$, $f_2$ and $f_3$ during transmission and return, noise-produced jitter may cause the phase-coincident condition of the return marker to be eroded. As previously explained with reference to FIG. 4, this condition is remedied by providing a window which accepts the time marker only when the frequencies $f_1$, $f_2$ and $f_3$ are separated in phase by a predetermined amount. The window is selected for maximum accuracy, and it is possible that extraordinary noise or interference conditions may cause phase-coincidence detector 35 occasionally to miss a time phase-coincident condition and respond to a false phase-coincident condition. It should be noted, however, that range finding is an ongoing process where the frequencies $f_1$, $f_2$ and $f_3$ are continuously being transmitted and returned providing an average range which is highly accurate.

Other modifications of the present invention are possible in light of the above disclosure which should not be limited other than by the claims which follow.

What is claimed is:

1. A continuous wave-ranging system, comprising in combination;
    a first station including first means for providing three sinusoidal signals which coincide in phase repetitively at equal intervals,
    said first station including second means for transmitting and third means for receiving said signals,
    a second station disposed at an unknown distance from said first station,
    said second station including fourth means for receiving and transmitting said signal back to said first station,
    said first station including fifth means responsive to said second means and said third means for detecting phase coincidences of said signals and for measuring the time between said phase coincidences of said signals during transmission to and reception from said second station.

2. A continuous wave-ranging system according to claim 1 wherein said first means comprises;
    a reference oscillator producing a reference frequency,
    three frequency dividers connected to said reference oscillator for dividing said reference frequency into said three sinusoidal signals.

3. A continuous wave-ranging system according to claim 2 wherein said fifth means comprises;
- a counter,
- first and second phase coincidence detectors connected to said counter,
- said first coincidence detector circuit responsive to phase coincidence of said signals at transmission to provide a start pulse to said counter,
- said second coincidence detector circuit responsive to phase coincidence of said signals at reception to provide a stop pulse to said counter.

4. A continuous wave-ranging system according to claim 3 further including;
- means connecting said reference oscillator to said counter whereby said counter counts at said reference frequency,
- converter means connected to said counter for converting the count in said counter to range.

5. A continuous wave-ranging system according to claim 4 wherein at least said second phase coincidence includes window generating means providing a pulse of predetermined time interval to provide a stop pulse to said counter only when each of said signals cross the zero axis during the interval of said window.

6. A continuous wave-rangig system according to claim 5 wherein said second means comprises;
- a phase-lock tracking filter connected to each of said frequency dividers for maintaining the phase relationships of said signals;
- a summing device connected to said phase-lock tracking filter for summing said signals along with data to be transmitted,
- a transmitter connected to said summing device for transmitting said signals and data,
- connector means connectinbg said phase-lock tracking filters to said first phase-coincidence detector.

7. A continuous wave-ranging system according to claim 6 wherein said third means comprises;
- a receiver,
- three phase-lock tracking filters connected to said receiver for separating said signals from each other, filtering out received data and maintaining the phase relationship of said signals,
- connector means connecting said three phase-lock tracking filters to said second coincident circuit.

8. A continuous wave-ranging system according to claim 7 wherein said fourth means comprises;
- a receiver for receiving said signals and transmitted data,
- three phase-lock tracking filters connected to said receiver for separating said signals, maintaining the phase relationship between said signals and filtering out the transmitted data,
- a summing device connected to said phase-lock tracking filters for summing said signals along with data to be transmitted back to said first station,
- a transmitter for transmitting the signals and data back to said first station.

9. A continuous wave-ranging system according to claim 8 wherein said three signals are closely spaced in frequency and occupy a small portion of the baseband used to transmit data between said first and second stations.

10. A continuous wave-ranging system according to claim 9 wherein each of said phase-lock tracking filters provides a narrow passband to prevent frequency overlap between said signals.

* * * * *

UNITED STATES PATENT AND TRADEMARK OFFICE
CERTIFICATE OF CORRECTION

PATENT NO. : 4,057,801

DATED : November 8, 1977

INVENTOR(S) : James E. Holladay, Jr., and Billie M. Spencer

It is certified that error appears in the above-identified patent and that said Letters Patent are hereby corrected as shown below:

ABSTRACT, Line 7, "conicidence" should be --coincidence--.

Column 1, Line 63, "but" should be --by--.

Column 2, Line 45, "required" should be --requires--.

Column 3, Line 18, "$f_3 - f_1 = \sqrt{2} (f_1 f_0)$" should be

--$f_3 - f_1 = \sqrt{2 (f_1 f_0)}$--.

Column 3, Line 36, "$f_c = f_0 (n_3 - n_1) (n_2 - n_1)$ LCM $[(n_3 - n_1) + 1] [(n_1 - n_1) + 1]$" should be --$f_c = f_0 (n_3 - n_1) (n_2 - n_1)$ LCM $[(n_3 - n_1) + 1] [(n_2 - n_1) + 1]$--.

Column 5, Line 63, "singal" should be -- signal--.

Claim 1, Column 6, Line 54, "signal" should be --signals--.

Claim 6, Column 7, Line 25, "wave-rangig" should be --wave-ranging--.

Claim 6, Column 7, Line 29, ";" should be --,--.

UNITED STATES PATENT AND TRADEMARK OFFICE
CERTIFICATE OF CORRECTION

PATENT NO. : 4,057,801

DATED : November 8, 1977

INVENTOR(S) : James E. Holladay, Jr., and Billie M. Spencer

It is certified that error appears in the above-identified patent and that said Letters Patent are hereby corrected as shown below:

Claim 6, Column 8, Line 1, "connectinbg" should be

---connecting---.

Signed and Sealed this

Twenty-eighth Day of February 1978

[SEAL]

Attest:

RUTH C. MASON
Attesting Officer

LUTRELLE F. PARKER
Acting Commissioner of Patents and Trademarks